Feb. 20, 1968   W. C. N. HOPKINS   3,369,829
FLEXIBLE CONNECTOR FOR FLUID CONDUIT SYSTEMS
Filed Oct. 15, 1965   2 Sheets-Sheet 1

INVENTOR
WILLIAM C. N. HOPKINS

BY *Irwin and Smiley*
ATTORNEYS

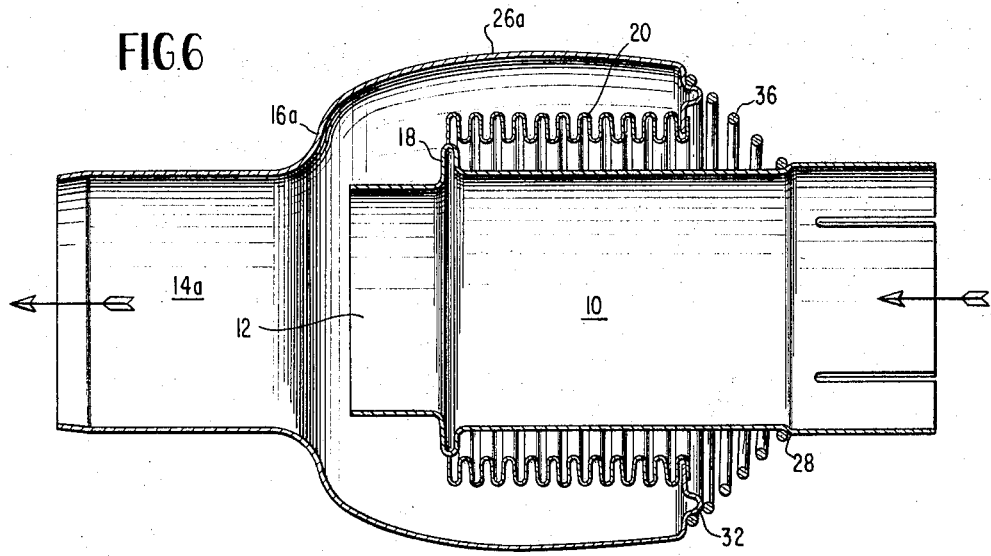
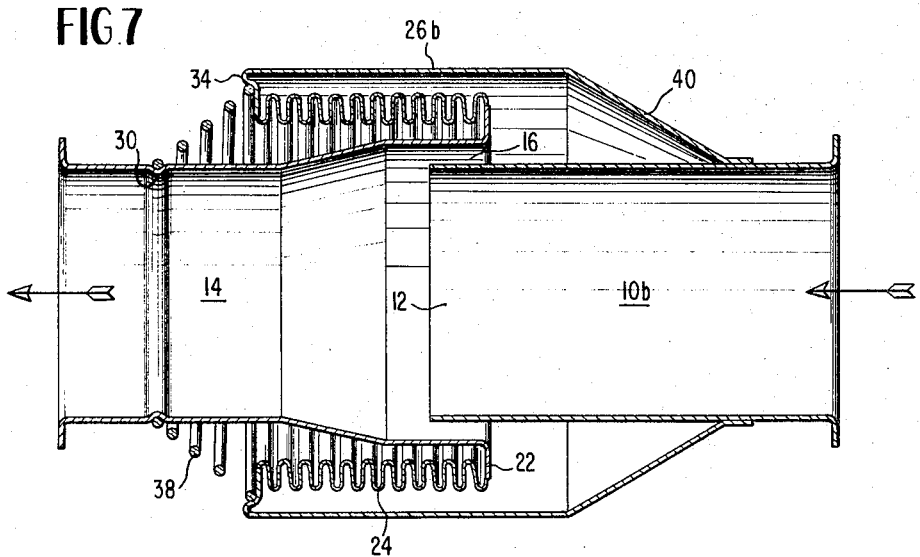

United States Patent Office 3,369,829
Patented Feb. 20, 1968

3,369,829
FLEXIBLE CONNECTOR FOR FLUID CONDUIT SYSTEMS
William C. N. Hopkins, P.O. Box 551,
Walnut Creek, Calif. 94597
Filed Oct. 15, 1965, Ser. No. 496,322
6 Claims. (Cl. 285—227)

This invention relates to flexible connectors for fluid conduit systems, and more particularly to a connector incorporating a tubular bellows that enables both telescopic and angular deviation.

Connectors of this type are employed in various kinds of fluid conduit systems adapted for handling both liquid and gaseous fluids. One of the principal uses for these connectors is in exhaust conduit systems for internal combustion engines. Despite the fact that the bellows in these connectors are formed of stainless steel, they have not been highly successful because of burn out due to the immediate exposure to exhaust flames. Because of being subjected to high pressures and temperatures, as well as to rapid changes thereof, the bellows sag and permit the different portions of the connectors to gall and cause metal fatigue resulting in breaks and leaks.

Having in mind the defects of the prior apparatus, it is an object of the present invention to provide a bellows type flexible connector wherein the bellows portion is protected from direct contact with exhaust flame as well as from the elements externally thereof.

It is another object of the invention to provide a bellows type flexible connector wherein the bellows portion is supported and relieved of the stress and strain of supporting the other portions of the connector.

It is a further object of the invention to provide a bellows type flexible connector having simplicity of design, economy of construction and efficiency in operation.

Briefly, a connector in accordance with the present invention comprises inlet and outlet conduit portions arranged with the outlet end portion of the inlet conduit portion freely telescoped within the inlet end of the outlet portion so that said portions are telescopically and angularly movable relative to each other. A bellows is secured at one end to at least one of said conduit portions and freely surrounds a portion of the length of said conduit portion. A shield freely and protectively surrounds the bellows and has one end secured to the other end of the bellows, while the other end of the shield is connected to the other conduit portion.

A frusto-conical coiled spring is interposed between the bellows surrounded conduit and the bellows connected end of the shield to center the two parts relative to each other and relieve the bellows from any supporting function relative to the conduit portion and sleeve. According to one modification of the invention, the connection between the other end of the shield and the other conduit portion is constituted by a second bellows and a second frusto-conical spring therebetween, whereas in other modifications the connection may be rigid.

The novel features that are considered characteristic of the invention are set forth with particularity in the appended claims. The invention itself, however, both as to its organization and its method of operation, together with additional objects and advantages thereof will best be understood from the following description of specific embodiments when read in connection with the accompanying drawings, wherein like reference characters indicate like parts throughout the several figures and in which:

FIGS. 6 and 7 are cross-sectional views taken longitudinally through modifications of the embodiment shown in FIG. 1.

Figure 1:
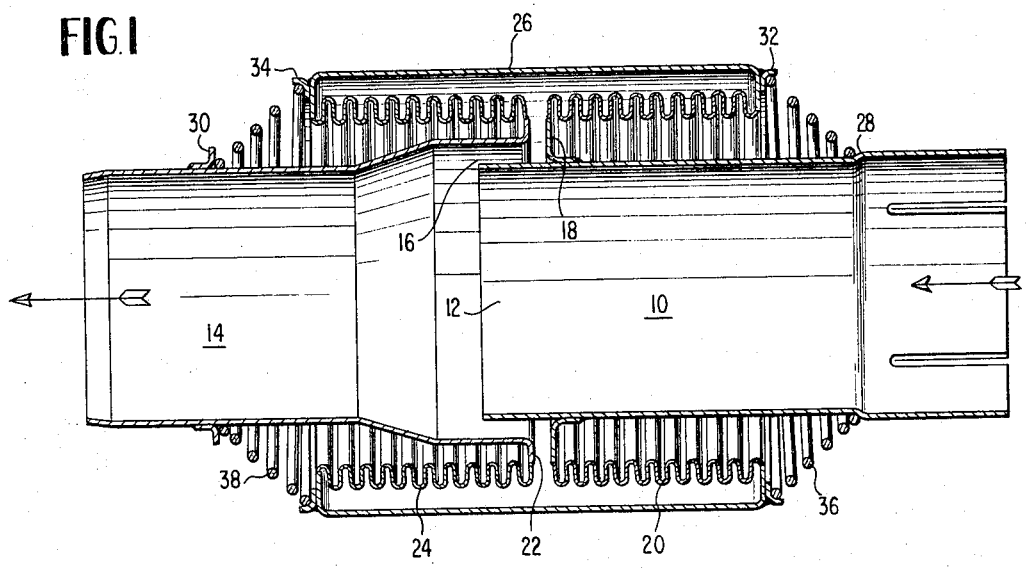
FIG. 1 is a cross-sectional view taken longitudinally through a flexible connector in accordance with the present invention.

Referring now to the drawings in detail, specifically to FIG. 1, a preferred embodiment of a connector in accordance with the present invention comprises an inlet conduit 10 having an outlet end 12 and an outlet conduit 14 having an inlet end 16. The opposite ends of said conduits may be of any desired form and configuration depending upon the use and type of fluid conducting system within which the connection is to be included.

Although the conduits 10 and 14 are of substantially the same cross-sectional area, the inlet end 16 of the outlet conduit 14 is enlarged so as to freely receive the outlet end 12 of the inlet conduit 10, the spacing therebetween being such as to enable both telescopic and angular movement between said conduits. The overlapping of the ends 12 and 16 is such, however, that the edge of the end 12 will always be positioned within the end 16 so that fluid flow will be directly from the inlet conduit 10 into the outlet conduit 14.

Secured around the inlet conduit 10 is a radially outwardly extending annular protrusion or flange 18 which is spaced forwardly of the outlet end 12 a distance sufficient to enable telescopic movement of said outlet end 12 within said inlet end 16. Secured to the peripheral portion of said annular protrusion or flange 18 is the rear end portion of a tubular bellows 20 which extends forwardly of said flange and surrounds in spaced relation a length of the inlet conduit 10.

Secured around the outlet conduit 14 adjacent the inlet end 16 is a radially outwardly extending annular protrusion or flange 22, and secured to the peripheral portion of this flange is the forward end portion of a tubular bellows 24 which extends rearwardly of said flange and surrounds in spaced relation a length of the outlet conduit 14. A tubular shield 26 surrounds in spaced relation both said bellows 20 and 24 and has its forward end secured to the forward end of the inlet conduit surrounding bellows 20, and its rear end secured to the rear end of the outlet conduit surrounding bellows 24. Preferably, the connections with both ends of the bellows 20, 24 are fluid tight.

The inlet conduit 10 and outlet conduit 14 are each provided with an anchorage or abutment 28 and 30, respectively, which may be in the form of a shoulder, groove, flange or the like, and the shield 26 is also provided with an anchorage or abutment 32 and 34 at its forward and rear ends, respectively. A coiled spring 36 of frusto-conical configuration is interposed between the inlet conduit 10 and the forward end of the shield 26, the smaller diameter end of said spring being anchored by the abutment 28 and its larger diameter end being anchored by the shield abutment 32. A similar coiled spring 38 is interposed between the outlet conduit anchorage 30 and the anchorage 34 at the rear end of the shield 26.

For exhaust systems, the bellows 20 and 24 are formed of stainless steel. These bellows are protected internally from exhaust flame by the disposition of the outlet end 12 within the inlet end 16 so that the fluid or gas passes directly from the inlet conduit 10 to the outlet conduit 14. The bellows are also protected externally from the elements by the shield 26. Finally, and most importantly, the springs 36 and 38 serve to center and support the shield 26 relative to the conduits 10 and 14 so that the bellows are supported at both ends and relieved of any supporting function, stress and strain themselves.

Figure 2:
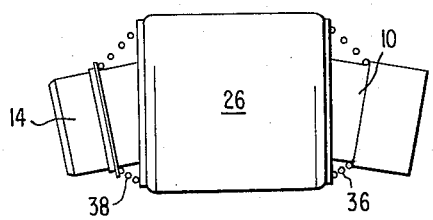
FIGS. 2–5 are diagrammatic elevational views of the connector shown in FIG. 1 and illustrating different adaptations thereof.
Figure 3:
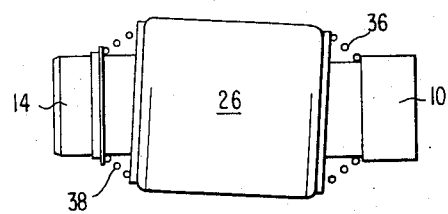
Figure 4:
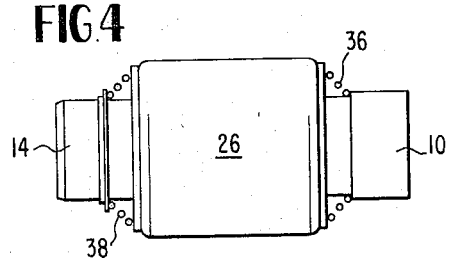
Figure 5:
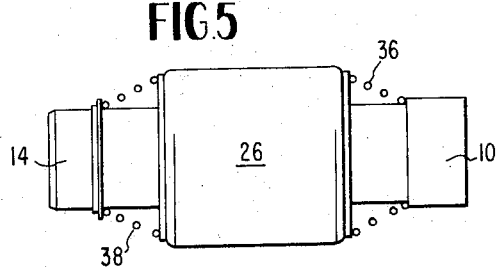

It will be apparent that this connector has great adaptability and flexibility in use. Due to the clearance between the outlet end 12 and inlet end 16, between the conduits and the surrounding bellows and between the shield and the bellows, the conduits 10 and 14 are capable of considerable relative movement. For example, as shown in FIG. 2, the conduits 10 and 14 may be angularly disposed for connecting angularly disposed conduits, or they may be axially offset, FIG. 3, telescopically contracted, FIG. 4, or telescopically expanded, FIG. 5. In all positions of adjustment, the springs 36 and 38 serve to center and support the shield 26 relative to the conduits so that the bellows are supported and while they may be flexed, they are not subject to other stresses.

While the hereinbefore described modification affords the greatest flexibility, other modifications having lesser flexibility but other advantages may incorporate the inventive concept, as shown in FIGS. 6 and 7, wherein the outer shield is rigid with one of the conduits. In FIG. 6, the shield 26a is integral with the expanded inlet end portios 16a of the outlet conduit 14a, only the bellows 20 connecting the protrusion 18 of the inlet conduit 10 with the free end of the shield. Nevertheless, the spring 36, anchored by abutments 28 and 32, serves to center the inlet and outlet conduits and support the bellows. This connector is particularly suitable for connection in a vertical stack because the integral connection between the shield and outlet conduit will prevent collection of foreign matter between the bellows and inlet conduit.

According to the modification of FIG. 7, the relationship is reversed in that the shield 26b is rigidly connected by a conical portion 40 with the inlet conduit 10b at a point forward of the outlet end 12 to accommodate the inlet end 16 of the outlet conduit 14. The bellows 24 is connected between the flange 22 and the rear end of the shield, and the spring 38 is interposed between the abutments 30 and 34 on the outlet conduit 14 and the shield 26b, respectively. This modification of the connector is particularly suitable for connection in a horizontally disposed exhaust conduit on a vehicle because the forward portion 40 of the shield 26b will protect the bellows 24 from the elements.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A flexible connector comprising an outlet conduit having an inlet end, an inlet conduit having an outlet end disposed within said inlet end of said outlet conduit, said inlet end surrounding said outlet end in spaced relation to enable both telescoping and angulation of said conduits relative to each other, a tubular bellows surrounding one of said conduits in spaced relation thereto, means securing one end of said bellows to the end portion of said surrounded conduit, a tubular shield surrounding said bellows in spaced relation thereto, means connecting one end of said shield to the other of said conduits, means securing together the other ends of said bellows and shield, and a coiled spring surrounding said one conduit and having one end anchored thereto, the other end of said spring being anchored to the bellows connected end of said shield and serving to center and align said conduits, said spring in frusto-conical in configuration with its smaller diameter end surrounding said conduit and its larger diameter end engaging said shield.

2. A connector according to claim 1 wherein said means connecting said one end of said shield to the other of said conduits comprises a second tubular bellows interposed in spaced relation between said other conduit and said shield, and a second frusto-conical coiled spring between said other conduit and said one end of said shield.

3. A connector according to claim 1 wherein said means connecting said one end of said shield to the other of said conduits comprises a fixed connection, whereby said shield and said other conduit are rigid.

4. A connector according to claim 3 wherein said other of said conduits comprises the inlet conduit.

5. A connector according to claim 3 wherein said other of said conduits comprises the outlet conduit.

6. A flexible connector comprising an outlet conduit having an inlet end, an inlet conduit having an outlet end disposed within said inlet end of said outlet conduit, said inlet end surrounding said outlet end in spaced relation to enable both telescoping and angulation of said conduits relative to each other, a pair of tubular bellows respectively surrounding each of said conduits in spaced relation thereto, means sealingly securing the rear end of the bellows surrounding said inlet conduit to the outlet end portion of said conduit at a point spaced forwardly of said outlet end, means sealingly securing the forward end of the bellows surrounding said outlet conduit to the inlet end of said conduit, a tubular shield surrounding both said bellows in spaced relation thereto, means connecting sealingly the forward end of said shield to the forward end of said bellows surrounding said inlet conduit, means sealingly securing the rear end of said shield to the rear end of said belows surrounding said outlet conduit, a pair of coiled springs respectively surrounding said each conduit and engaging the respective end of said shield, said springs being of frusto-conical configuration and having their smaller diameter ends anchored to the respective conduits with their larger diameter ends anchored to the respective ends of said shield and serving to center and align said shield and conduits.

References Cited

UNITED STATES PATENTS

| 1,351,875 | 9/1920 | Schreiber | 285—229 X |
| 2,418,653 | 4/1947 | McCormack | 285—226 X |
| 3,038,553 | 6/1962 | Peters | 285—226 X |
| 3,053,554 | 9/1962 | Magos et al. | 285—226 X |

FOREIGN PATENTS

| 658,066 | 1/1929 | France. |
| 369,632 | 7/1963 | Switzerland. |

CARL W. TOMLIN, Primary Examiner.

T. F. CALLAGHAN, Examiner.